(12) United States Patent
Teranishi

(10) Patent No.: US 10,511,577 B2
(45) Date of Patent: Dec. 17, 2019

(54) SECRET CHARACTER STRING CALCULATION SYSTEM, METHOD AND APPARATUS, AND NON-TRANSITORY RECORDING MEDIUM

(71) Applicant: NEC Corporation, Tokyo (JP)

(72) Inventor: Isamu Teranishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 122 days.

(21) Appl. No.: 15/559,562

(22) PCT Filed: Mar. 18, 2016

(86) PCT No.: PCT/JP2016/058733
§ 371 (c)(1),
(2) Date: Sep. 19, 2017

(87) PCT Pub. No.: WO2016/148281
PCT Pub. Date: Sep. 22, 2016

(65) Prior Publication Data
US 2018/0048625 A1   Feb. 15, 2018

(30) Foreign Application Priority Data
Mar. 19, 2015   (JP) .................. 2015-056367

(51) Int. Cl.
*H04L 9/00* (2006.01)
*H04L 29/06* (2006.01)
(Continued)

(52) U.S. Cl.
CPC .......... *H04L 63/0428* (2013.01); *H04L 9/085* (2013.01); *H04L 9/088* (2013.01); *G09C 1/10* (2013.01); *H04L 2209/46* (2013.01)

(58) Field of Classification Search
CPC .................................. H04L 63/0428
See application file for complete search history.

(56) References Cited

U.S. PATENT DOCUMENTS 5,991,414 A * 11/1999 Garay .............. H04L 9/302
380/30
8,170,216 B2  5/2012 Vishnu et al.
(Continued)

FOREIGN PATENT DOCUMENTS

JP   2007-140869   6/2007

OTHER PUBLICATIONS

International Search Report, PCT/JP2016/058733, dated Jun. 7, 2016.
(Continued)

*Primary Examiner* — Josnel Jeudy
(74) *Attorney, Agent, or Firm* — Young & Thompson

(57) ABSTRACT

A registration apparatus generates shares by secret sharing of a character string with a plurality of modulus and sends the shares to a plurality of server apparatuses to be stored therein. A retrieval apparatus sends shares generated by secret sharing of a retrieval character string with the plurality of modulus to the plurality of server apparatuses. The plurality of server apparatuses execute a subroutine for shares of the each registration character string stored in a storage unit and for each of the plurality of modulus, reconstruct an execution result, and determine whether or not to return the shares of the registration character string stored in the storage unit as a retrieval result. A retrieval apparatus reconstructs shares returned from the plurality of server apparatuses and obtains a retrieval result in which the retrieval character string hits, from the reconstructed result by the Chinese remainder theorem.

13 Claims, 3 Drawing Sheets

(51) Int. Cl.
  *H04L 9/08* (2006.01)
  *G09C 1/10* (2006.01)

(56) References Cited

U.S. PATENT DOCUMENTS

| | | | |
|---|---|---|---|
| 9,384,149 B2 * | 7/2016 | Johnson | G06F 12/1408 |
| 9,450,923 B2 * | 9/2016 | Klum | H04L 63/0428 |
| 2005/0123131 A1 * | 6/2005 | Naccache | H04L 9/0894 |
| | | | 380/30 |
| 2005/0154893 A1 * | 7/2005 | Muratani | G06T 1/005 |
| | | | 713/176 |
| 2012/0159645 A1 | 6/2012 | Vishnu et al. | |
| 2019/0007209 A1 * | 1/2019 | Ruan | H04L 9/302 |

OTHER PUBLICATIONS

Shamir, Adi, "How to share a secret", Communications of the ACM, vol. 22 (11): pp. 612-613, 1979.
O. Goldreich et al., "How to play ANY mental game", In Proceedings of the nineteenth annual ACM conference on Theory of calculating, pp. 218-229., ACM Press; 1987.

* cited by examiner

SECRET CHARACTER STRING CALCULATION SYSTEM, METHOD AND APPARATUS, AND NON-TRANSITORY RECORDING MEDIUM

REFERENCE TO RELATED APPLICATION

The present invention is based on Japanese Patent Application No. 2015-056367 (filed on Mar. 19, 2015), the entire disclosures thereof are incorporated herein by reference thereto.

The present invention relates to a secret character string calculation system a method, an apparatus and a non-transitory recording medium storing therein a program.

TECHNICAL FIELD

Background

In a (k, n) threshold secret sharing scheme which is a representative method of secret sharing, secret information S is encoded into n pieces of shared information Wi. When arbitrary k pieces out of the shared information are collected, the original secret information S can be completely reconstructed, while the secret information S cannot be reconstructed with k-1 pieces of shared information (see Non-Patent Document 1). A multiparty computation is a technology to obtain a specific function value Fi (a1, ..., aN), with each calculating entity i (i=1, ..., N) receiving a value ai as an input and without revealing the value ai to other calculating entities.

<Modulo Operation>

Regarding integers a and p, a remainder obtained by dividing a by p is denoted as (a mod p). Furthermore, regarding integers a, b, and p, a fact that (a mod p) is equal to (b mod p), is denoted as "a=b mod p". An integer ring is represented by Z, and Z/pZ represents a ring with an operation by "mod p" for $\{0, \ldots, p-1\}$. In "mod p" operations, p is called "modulus".

<Chinese Remainder Theorem>

If n number of prime integers $p[1], \ldots, p[n]$ are pairwise coprime, and if arbitrarily given integers $a[i] \in Z_{p[i]}\{i=1, 2, \ldots, n\}$, then such an integer a satisfying $$a = (a[1] \bmod p[1]),$$

$$a = (a[2] \bmod p[2]), \ldots,$$

$$\ldots,$$

$$a = (a[n] \bmod p[n])$$

is uniquely determined with modulo $p[1] \ldots p[n]$ ($0 \leq a < p[1] \ldots p[n]$).

According to the Chinese Remainder theorem, $x = (a \bmod p[1] \ldots p[n])$ is a function of $a[1], \ldots, a[n]$. This function is denoted as:

$$x = \text{ChineseRemainder}(a[1], \ldots, a[n]) \quad (1)$$

It is known that the function ChineseRemainder $(a[1], \ldots, a[n])$ can be computed efficiently.

<Carmichael Function>

A Carmichael function is a function A that returns the smallest n that for a given integer p, $a^n = 1 \bmod p$ holds for a which is coprime to an arbitrary p.

$$a^{\lambda(p)} = 1 \bmod p \quad (2)$$

The Carmichael function A is recursively defined as follows.

when p is $q^k$ (q: odd prime), $$\lambda(q^k) = q^{k-1}(q-1)$$

when p is $2^k$, and k is 3 or more, $\lambda(2^k) = 2^{k-2}$ $\lambda(2^k) = 1$, if $k=1$, $$\lambda(2^k) = 2, \text{ if } k=2, \quad (3)$$

$p = q_1^{k1} q_2^{k2} \ldots q_m^{km}$ (when $q_1, q_2, \ldots, q_m$ are coprime), $$\lambda(q_1^{k1} q_2^{k2} \ldots q_m^{km}) = \text{lcm}(\lambda(q_1^{k1}), \lambda(q_2^{k2}), \ldots, \lambda(q_m^{km})) \text{ (lcm: least common multiple)} \quad (4)$$

<Secret Sharing>

In a secret sharing scheme (Share, Reconst), a user who is a holder of a secret s generates values s1, ..., sN called N shares (shared information) from s and secretly passes s1, ..., sN to N servers M[1], ..., M[N] which are share holders. After that, k shares are collected from arbitrary k servers, and the secret s can be reconstructed by a predetermined calculation. There are two protocols to share and hold with multiple servers M[1], ..., M[N], a share generation function Share that creates shares from secret s and a restoration function Reconst that reconstructs secret s from the shares. As in the scheme disclosed in Non Patent Literature 1, there are often cases where the share is an element of Z/pZ.

In this description, since such a situation is considered where the share is an element of Z/pZ, a secret sharing scheme under such the situation will be described. Here, p is some integer. The secret sharing under such a situation is called "secret sharing with modulus p", and a share generated in "secret sharing with modulus p" is called "share of secret s with mod p" or "share of secret s with modulus p".

Input and output of Share and Reconst functions are as follows:

<Share Generation Function Share>

The share generation function Share receives a secret s, the number of servers N and an integer p as inputs, and outputs shares (shared information) of s with mod p: x[1], ..., x[N].

<Reconstruction function Reconst>

The restoration function Reconst receives all or part of the shares with mod p: x[1], ..., x[N] and p as inputs, and outputs secret a or data indicating "restoration failure"

The secret sharing scheme (Share, Reconst) is used in the following procedures.

First, when a user U is going to make the secret s shared by the servers M[1], ..., M[N], the user U executes Share (s, N, p) to obtain outputs (shares) x[1], ..., x[N].

Then, the user U sends the share x[1] to the server M[1], ..., and sends the share x[N] to the server M[N].

After that, when the user U needs to reconstruct the secret from the shares, the servers M[i_1], ..., M[i_t] that satisfy $\{i\_1, \ldots, i\_t\} \in \text{Access}$ send shares x[i_1], ..., x[i_t] to the user U.

The user U executes Reconst (x[i-1], ..., x[i_t]) to obtain a secret s.

Here, the description is made supposing that the user U executes Reconst (x[i-1], ..., X[i_t]), but other users or servers may execute Reconst (x[i-1], ..., x[i_t]).

<Access Structure>

When a set of subsets of $\{1, \ldots, N\}$: Access satisfies the following, the set Access is called an access structure on $\{1, \ldots, N\}$:

If $S \in \text{Access}$ and $S \subset T$, then $T \in \text{Access}$ (5)

<Access—Safe>

When (Share, Reconst) satisfies the following, for an Access set on $\{1, \ldots, N\}$, (Share, Reconst) may be said to be Access-safe.

Let $x[1], \ldots, x[N]$ be outputs of Share (s, N, p), and $S = \{i\_1, \ldots, i\_t\}$ be a subset of $\{1, \ldots, N\}$.

If $S \in \text{Access}$, then Reconst $(x[i\_1], \ldots, x[i\_t], p)$ outputs s.

If $S \in \text{Access}$ does not hold, then it is not possible to find out any partial information of s from the shares: $x[i\_1], \ldots, x[i\_t]$.

<MPC (Multiparty Computation) Protocol>

Multiparty computation (MPC) protocol is a technique for securely calculating any algorithm using a plurality of servers. In the embodiment described below, three kinds of MPC protocols, i.e., "multiplicative modulus MPC protocol", "exponentiation modulus MPC protocol", and "random number generation MPC protocol", will be used.

Let p be an integer and let $x[1], \ldots, x[N]$ be shares of some integer a with mod p, $y[1], \ldots, y[N]$ be shares of some integer b with mod p.

<Multiplicative Modulus MPC Protocol>

A multiplicative modulus MPC protocol is an MPC that securely executes a multiplicative modulus algorithm. A server apparatus M[1] is executed with $(x[1], y[1], p)$ as input, ..., and a server apparatus M[N] is executed with $(x[N], y[N], p)$ as input. The server apparatus M[1] receives $z[1]$ as output, ..., and the server apparatus M[N] receives $z[N]$ as output.

Here, $z[1], \ldots, z[N]$ are shares of (ab mod p) in mod p.

<Modular Exponentiation MPC Protocol>

A modular exponentiation MPC protocol is an MPC that securely performs a modular exponentiation algorithm. The server M[1] is executed with $(x[1], n, p), \ldots$, the server M[N] is executed with $(x[N], n, p)$ as input, and the server apparatus M[1] receives $w[1], \ldots$, the server apparatus M[N] receives $w[N]$ as output.

Here, n is an integer, and $w[1], \ldots, w[N]$ are shares of $(a^n \bmod p)$ in mod p.

<Random Number Generation MPC Protocol>

A random number generation MPC protocol is an MPC that securely executes a random number generation algorithm. Each of the server apparatuses M[1], ... M[N] is executed with p as input, and the server apparatus M[1] receives $u[1], \ldots$, the server apparatus M[N] receives $u[N]$ as output.

Here, $u[1], \ldots, u[N]$ are shares of a uniform random number on Z/pZ in mod p.

Various methods have been known as methods for realizing these protocols, for example, the method described in Non-Patent Literature 2 can be used.

CITATION LIST

Non-Patent Literature

Non-Patent Literature 1:
Shamir, Adi, "How to share a secret", Communications of the ACM, Volume 22 (11): pages 612-613, 1979

Non-Patent Literature 2:
O. Goldreich, S. Micali, and A. Wigderson. "How to play ANY mental game", In Proceedings of the nineteenth annual ACM conference on Theory of calculating, pages 218-229. ACM Press, 1987

SUMMARY

The analysis of the related arts is given below.

Recently, with a wide spread use of cloud technologies, such a service is becoming popular where a user deposits data in a database located in a cloud, etc., and at a later date the user retrieves and uses necessary data items from the data deposited in the database.

However, with such a service, a database administrator can inspect all data deposited by a user. Therefore, for example, if a user deposits data in the database, there is a possibility that privacy of the user is leaked to the database administrator.

The possibility can be avoided by encrypting in advance data to be deposited in the database on the user side, and registering the encrypted data in the database. However, if the data has been encrypted and registered in the database, when retrieving necessary data from the database at a later date, it is not possible to perform retrieval using a plain text or the like.

In order to cope with such a problem, for example, the MPC protocol described above is used. The MPC protocol is a protocol that starts from a state in which data $x[1], \ldots, x[n]$ are shared and held by a plurality of servers, and securely calculates necessary values $F(x[1], \ldots, x[n])$ according to some algorithm F from the shared data. "Share (shared information)" is created in a secret sharing scheme.

With a retrieval algorithm being set to the above F, "whether a retrieval hits or not" being set to "necessary value", and with use of the MPC protocol, it is possible in principle to realize a secure retrieval. Regarding the MPC protocol, various proposals have been made, but as described later, those are inefficient.

The present invention has been invented in view of the above problem. It is an object of the present invention to provide a secret character string calculation system a method, an apparatus, and a non-transitory recording medium storing a program, each of which can realize efficient retrieval with respect to an MPC protocol.

According to one aspect of the present invention, there is provided a secret character string calculation system comprising: a registration apparatus; a retrieval apparatus; and a plurality of server apparatuses, wherein the registration apparatus comprises a registration character string share generation unit configured to generate shares by secret sharing of a registration character string, with a plurality of modulus, wherein the registration apparatus sends the shares generated by the registration character string share generation unit to the plurality of server apparatuses, respectively, wherein the plurality of server apparatuses respectively store the received shares in storage units thereof, wherein the retrieval apparatus further comprises a retrieval character string share generation unit configured to generate shares by secret sharing of a retrieval character string with the plurality of modulus, wherein the retrieval apparatus sends the shares generated by the retrieval character string share generation unit to the plurality of server apparatuses, respectively, wherein the plurality of server apparatuses each comprise a retrieval response calculation unit configured to execute a predetermined operation processing for the shares of each character string stored in the each storage unit and for each of the plurality of modulus, reconstruct the execution result of the operation processing, and determine, based on the reconstruction result of the execution result, whether or not to return the shares of the registration character string stored in the storage unit, as a retrieval result, and wherein the retrieval apparatus further comprises a reconstruction unit configured to reconstruct shares returned from the plurality of server apparatuses, and reconstruct, using the Chinese remainder theorem, a retrieval result from the reconstructed result.

According to another aspect of the present invention, there is provided a method for performing a secret character string calculation by a computer system including a plurality of server apparatuses, the method comprising:

generating shares by secret sharing of a registration character string with a plurality of modulus and sending the shares to the plurality of server apparatuses, respectively, to have the shares stored in the plurality of server apparatuses;

sending shares generated by secret sharing of a retrieval character string with the plurality of modulus to the plurality of server apparatuses;

the plurality of server apparatuses each calling a subroutine for the stored shares of each registration character string and for each of the plurality of modulus, to execute an operation processing, reconstruct the execution result of the operation processing, and determine, based on the reconstruction result of the execution result, whether or not to return the stored shares of the registration character string as a retrieval result; and reconstructing the shares returned from the plurality of server apparatuses, and reconstructing, using the Chinese remainder theorem, the retrieval result from the reconstructed result.

According to another aspect of the present invention, there is provided a server apparatus, comprising:

a communication unit configured to receive shares sent from a registration apparatus that generates the shares by secret sharing of a registration character string with a plurality of modulus, to a plurality of server apparatuses;

a storage unit configured to store the received share of the registration character string; and a retrieval response calculation unit configured to execute a predetermined operation processing for the shares of each character string stored in the storage unit and for each of the plurality of modulus, reconstruct the execution result and determine, based on the reconstruction result of the execution result, whether or not to return the shares of the registration character string stored in the storage unit as a retrieval result, when the communication unit receives shares from a retrieval apparatus that sends the shares by secret sharing of a retrieval character string with the plurality of modulus to the plurality of server apparatuses, wherein the server apparatus sends the shares of the retrieval result, via the communication unit, to the retrieval apparatus that is operable to reconstruct, using the Chinese remainder theorem, a retrieval result from a reconstructed result of the shares returned from each of the server apparatuses.

According to still another aspect of the present invention, there is provided a non-transitory computer-readable recording medium storing therein a program that causes a computer constituting a server apparatus to execute:

a processing of receiving shares and storing the shares in a storage unit, the shares being sent from a registration apparatus that generates the shares by secret sharing of a registration character string with a plurality of modulus and sends the shares to a plurality of server apparatuses;

a retrieval response calculation processing of executing a predetermined operation processing for the share of the each registration character string stored in the storage unit and for each of the plurality of modulus, reconstructing the execution result of the operation processing and determining, based on the reconstruction result of the execution result, whether or not to return the shares of the registration character string stored in the storage unit as a retrieval result; and a processing of sending the shares of the retrieval result to the retrieval apparatus. The non-transitory computer-readable recording medium may be a semiconductor storage or magnetic/optical recording medium, etc.

According to still another aspect of the present invention, there is provided a retrieval apparatus comprising:

a communication unit configured to communicatively connect to a plurality of server apparatuses that receive from a registration apparatus that generates shares by secret sharing of a registration character string with a plurality of modulus; and a retrieval character string share generation configured to generate shares by secret sharing of a retrieval character string with the plurality of modulus, wherein the retrieval apparatus sends the shares generated by the retrieval character string share generation unit, via the communication unit, to the plurality of server apparatuses, respectively, wherein the plurality of server apparatuses each executes a predetermined operation processing for the shares of each character string stored in the each storage unit and for each of the plurality of modulus, reconstructs the execution result of the operation processing, and determines, based on the reconstruction result of the execution result, whether or not to return the shares of the registration character string stored in the storage unit, as a retrieval result, wherein the retrieval apparatus further comprises a reconstruction unit configured to reconstruct shares returned from the plurality of server apparatuses, and reconstruct, using the Chinese remainder theorem, a retrieval result from the reconstructed result.

Advantageous Effects of the Invention

According to the present invention, with respect to an MPC protocol, an efficient retrieval can be realized. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
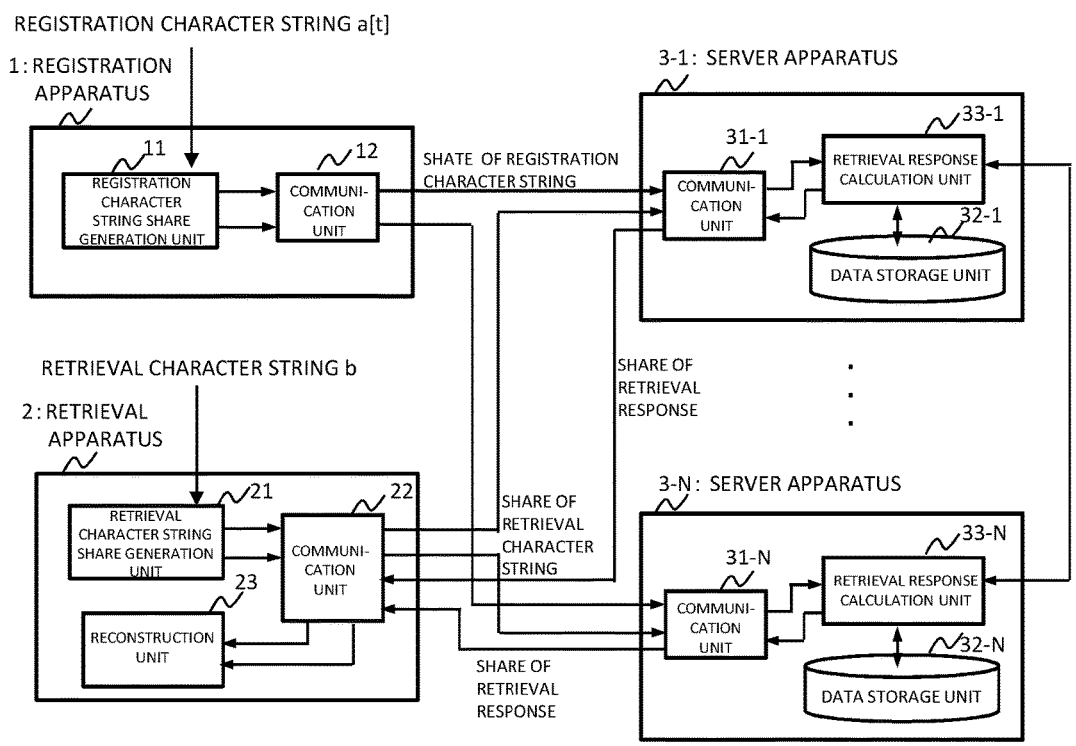
FIG. 1 is a diagram illustrating a configuration example of an example embodiment of the present invention.

Example embodiments of the present invention will be described. As described above, the MPC protocol for general algorithms is very inefficient. The present embodiment can realize efficient retrieval by efficiently designing a retrieval algorithm F.

It is known that a cause of deterioration in efficiency of the MPC protocol lies in multiplication. That is, the more the retrieval algorithm F contains multiplication, the less efficient the MPC protocol for calculating the necessary value $F(x[1], \ldots, X[n])$ becomes.

Therefore, in the present example embodiment, in order to improve the efficiency of the MPC protocol, such an algorithm is realized that executes retrieval with multiplication reduced as much as possible.

Although not particularly limited thereto, a character string handled in the embodiment is such a string obtained by arranging a plurality of units, each of which is called "word". It is assumed that "word" is a bit string of W bits (where W is a predetermined positive integer, for example, 8, 16, 32, etc.).

A case where a character string $a=a[1]\|\ldots\|a[n]$ stored in a database contains a retrieval character string $b=b[1]\|\ldots\|b[m]$ as a substring, is regarded as "a hits retrieval condition b", where "$\|$" represents a concatenation of character strings. $a[1]$ to $a[n]$, $b[1]$ to $b[m]$ are words.

A necessary and sufficient condition that "a hits the retrieval condition b" is given below.

There is some $j \in \{1, \ldots n-m\}$ such that:

$$a[j+1]=b[1], \text{ and } \ldots, \text{ and } a[j+m]=b[m] \quad (6)$$

In order to present a method for performing retrieval, the condition that "a hits retrieval condition b" is rewritten to another condition.

A function G is defined below.

$$G(x)=0 \text{ if } x=0$$

$$G(x)=1 \text{ if } x \neq 0 \quad (7)$$

(That is, if $x=0$ then $G(x)=0$, if not $x=0$ then $G(x)=1$.)

Then, the above condition (formula (6)) is equivalent to the following:

Assuming $$c[j,k]=G(a[j+k]-b[k]), \text{ and}$$

$$u[j]=c[j,1]+\ldots+c[j,m],$$

there is some $j \in \{1, \ldots n-m\}$ such that $$u[j]=0 \mod X \quad (8)$$

where X is an integer (a concrete value will be described later).

In the MPC protocol, the computation of "mod X" is used. The above (8) is denoted as $$u[j]=0 \mod X \text{(where mod } X \text{" is added)}.$$

If X takes a value larger than $2^{\wedge}W$ ($^{\wedge}$ is an exponentiation operator: equivalent to $2^W$) and $\log_2 n$, logarithm with 2 as a base, it is easy to ascertain that a necessary and sufficient condition that $u[j]=0$ is $$u[j]=0 \mod X \quad (9)$$

Using the above function G, a condition that "there exists some $j \in \{1, \ldots, n-m\}$ such that $u[j]=0$" is equivalent to the following.

Assuming $d[j]=G(u[j])$, $$(n-m-d[1]-d[2]-\ldots-d[n-m]) \neq 0 \mod X \quad (10)$$

The reason for using "mod X" is the same as above.

When it is assumed that the following algorithm is denoted as $F_X(a, b)$, it can seen that whether "a hits retrieval condition b" is determined by whether $F_X(a, b)$="hit" or not (a subscript of $F_X$ specifies that "mod X" is used in the algorithm).

Step 1:
Compute the following:
For $j=1, \ldots, n-m$, and $k=1, \ldots, m$, $$c[j,k]=G(a[j+k]-b[k]) \mod X \quad (11)$$

Step 2:
Compute the following:
For $j=1, \ldots, n-m$, $$u[j]=c[j,1]+\ldots+c[j,m] \mod X \quad (12)$$

Step 3:
Compute the following:
For $j=1, \ldots, n-m$, $$d[j]=G(u[j]) \quad (13)$$

Step 4:
Compute the following:

$$e=(n-m-d[1]-\ldots-d[n-m]) \times (\text{random number}) \mod X \quad (14)$$

Step 5:
Output:

If $e=0 \mod X$ then "no hit",

If $e \neq 0 \mod X$ then "hit" $\quad (15)$

In Step 4, a random number is multiplied in order to prevent information leakage to an attacker, from the value of e, when creating a MPC protocol which computes $F_X$ later.

As described earlier, the more the function $F_X$ uses multiplication, the slower the speed of the MPC protocol to compute $F_X$ becomes.

In the above algorithm $F_X(a, b)$, multiplication is not used. Therefore, it is efficient. The function G of the subroutine may be realized by multiplying as less as possible.

Let $\lambda(x)$ be the Carmichael function and $H(x, X)$ be defined as below.

$$H(x,X)=x^{\wedge}\lambda(X) \mod X \quad (16)$$

From the definition of the Carmichael function $\lambda(x)$, $H(x, X)$ takes the following values.

If $x=0$, then $H(x,X)=0 \mod X$,

If $x \neq 0$, then $H(x,X)=1 \mod X \quad (17)$

Therefore, $H(x, X)$ can be used as the subroutine $G(x)$ of $F_X(a, b)$.

As described above, X must be larger than the bit length W of the word. Therefore, when $H(x, X)$ is used as $G(x)$, the efficiency decreases when W is a large value. For example, if int type 32 bits of the C language is 1 word (W=32), $2^{\wedge}W=2^{\wedge}32=4,294,967,296$, which is a large value and inefficient.

Therefore, by further improving $F_X(a, b)$, this problem is avoided.

For improvement, X is chosen to satisfy $$X=\Pi_{p \in S} p \quad (18).$$

Here, the set S is a set of integers satisfying mutually prime p and q for arbitrary $p, q \in S$. Therefore, X is a product of mutually prime integers $p, q, \ldots$ contained in the set S.

Then, let's consider the following algorithm $I_X(a, b)$.

<Algorithm $I_X(a, b)$>

For each $p \in S$, $F_p(a, b)$ is executed ($H(x, p)$ is used as the subroutine $G(x)$).

Let $e[p]$ be an output of $F_p(a, b)$.

Output:

for all p∈S, if e[p]=0 mod p, then "no hit", if e[p]≠0 mod p, then "hit"

Since $X=\Pi_{p \in S} p$, for any p∈S, the Carmichael function $\lambda(p)$ is a submultiple of $\lambda(X)$. That is, X contains p as a divisor, and from the definition of the Carmichael function (equation (2)), it can be seen that $\lambda(p)$ is a divisor of $\lambda(X)$. Since $x^{\lambda}(p)$ is 1 or 0, the following holds.

$$H(x,X)=x^{\lambda}(X)=x^{\lambda}(p)=H(x,p) \bmod p \qquad (19)$$

Therefore, from the Chinese Remainder Theorem, the output of $I_X(a, b)$ is equal to the output of $F_X(a, b)$. Moreover, in the algorithm $I_X(a, b)$ of the embodiment, $$H(x,p)=x^{\lambda}(p) \bmod p \qquad (20)$$

is computed instead of H(x, X) of $F_X(a, b)$.

Since the $\lambda(p)$ is smaller than $\lambda(X)$, the computation of $$H(x,p)=x^{\lambda}(p) \bmod p$$

is more efficient than the computation of $$H(x,X)=x\lambda\lambda(X) \bmod X.$$

Therefore, the above algorithm $I_X(a, b)$ solves the above-described problem (the efficiency of $F_X(a, b)$ is poor).

Therefore, in the present embodiment, an MPC protocol for executing the algorithm $I_X(a, b)$ is created. The following describes an embodiment.

<Apparatus Configuration>

FIG. 1 is a diagram for explaining a configuration example of a system according to an embodiment of the present invention. Referring to FIG. 1, the system of the embodiment includes a registration apparatus 1, a retrieval apparatus 2, N server apparatuses 3-1, . . . , 3-N. The registration apparatus 1 may be a separate apparatus from the retrieval apparatus 2 or may be the same apparatus. Further, the registration apparatus 1 and the retrieval apparatus 2 may coincide with any one of the server apparatuses 3-1, . . . , 3-N.

The registration apparatus 1 includes a registration character string share generation unit 11 and a communication unit 12. The registration apparatus 1 registers character strings a[1], a[2], . . . in the server apparatuses 3-1, . . . , 3-N.

The registration apparatus 1 that registers the character string a[1], a[2], . . . may be different for each character string or may be the same. In FIG. 1, it is assumed that all a[1], a[2], . . . are registered by the same registration apparatus 1 and the t-th character string is registered. It is a matter of course that processing and control of part or all of the parts of the registration apparatus 1 may be implemented by program control.

The retrieval apparatus 2 includes a retrieval character string share generation unit 21, a communication unit 22, and a reconstruction unit 23. The retrieval apparatus 2 retrieves character strings stored in the server apparatuses 3-1, . . . , 3-N. In FIG. 1, one retrieval apparatus 2 performs all retrieval. However, the retrieval apparatus 2 may be different for each retrieval character string b. It is a matter of course that processing and control of part or all of the parts of the retrieval apparatus 2 may be implemented by program control.

The server apparatus 3-α (α=1, . . . , N) includes a communication unit 31-α, a data storage unit 32-α, and a retrieval response calculation unit 33-α. Processing and control of part or all of the parts of the server 3-α may, as a matter of course, be implemented by program control.

The following describes an outline of operations of the registration apparatus 1, the retrieval apparatus 2, and the server apparatuses 3-1, . . . , 3-N in the present embodiment.

The registration apparatus 1 computes shares of a[t] using the registration character string share generation unit 11 and sends the shares to the server apparatuses 3-1, . . . , 3-N by using the communication unit 12.

The server apparatuses 3-1, . . . , 3-N receive the shares using the communication units 31-1, . . . , 31-N of the server apparatuses and store the received shares in the data storage units 32-1, . . . , 32-N, respectively.

The details of the above procedure will be described in <Registration method> which will be described later.

When retrieving data registered in the server apparatuses 3-1, . . . , 3-N, the retrieval apparatus 2 computes shares of a retrieval character string using the retrieval character string share generation unit 21 and sends the shares of the retrieval character string to the server apparatuses 3-1, . . . , 3-N respectively by using the communication unit 22.

The server apparatuses 3-1, . . . , 3-N respectively determine data to be returned, while communicating with each other by using the retrieval response calculation units 33-1, . . . , 33-N. The server apparatuses 3-1, . . . , 3-N respectively send the shares of the retrieval response to the retrieval apparatus 2 by using the communication units 33-1, . . . , 33-N.

The retrieval apparatus 2 receives the shares using the communication unit 22, and reconstructs a retrieval result from the shares by using the reconstruction unit 23.

Details of the above procedure will be described in <Retrieval method> later described.

This embodiment relates to the retrieval of character strings, and it is assumed that character strings registered by the registration apparatus in the server apparatus are all composed of n words. It is assumed that each word is a bit string of W bits.

Let Δ be a security parameter. The larger Δ is, the more secure it becomes, but the less efficient it is. Therefore, it is necessary to select an appropriate λ. Although not particularly limited, it is recommended that Δ be set to 160, for example.

Let S be a set of integers satisfying the following two properties:

For arbitrary p,q∈S, p and q are mutually prime. (21)

$\cdot 2^W$, $\log_2 n \leq \Pi_{p \in S} p$ (22)

If the above conditions (21) and (22) are satisfied, S may be any set. For example, as a set S, small prime numbers such as 2, 3, 5, . . . may be collected until the above condition (inequality (22)) is satisfied.

Let Access be an access structure on the set {1, . . . N} and let (Share, Reconst) be an Access-secure secret sharing scheme.

<Registration Method>

Let a[t] be a character string and let the ith word of a[t] be denoted as a[t, i]. The symbol "||" represents concatenation of character strings. From the definition, it can be defined as $$a[t]=a[t,1]\| \ldots \|a[t,n] \qquad (23).$$

A method in which the registration apparatus 1 registers the character string a[t] in the server apparatuses 3-1, . . . , 3-N will be described.

Step 1:
For each i=1, ..., n, each p∈S, the registration character string share generation unit 11 of the registration apparatus 1 executes $$\text{Share}(a[t,i],N,p) \tag{24}$$

and obtains its output (shares)

$$x[t,i,1,p], \ldots, x[t,i,N,p] \tag{25}.$$

Step 2:
For each i=1, ..., n, each α=1, ..., N, each p∈S, the registration apparatus 1 sends the share x[t, i, α, p] to the server apparatus 3-j via the communication unit 12.

Step 3:
For each α=1, ..., N, each p∈S, the server apparatus 3-α stores $$x[t,1,\alpha,p] \| \ldots \| x[t,n,a,p] \tag{26}.$$

(∥ is a concatenation operator).

<Retrieval Method>
When $$a=a[1] \| \ldots \| a[n], b=b[1] \| \ldots \| b[m] \tag{27}$$

is a character string, a includes b as a partial character string means that, as described above, some i∈{0, ..., n−m} exists and $$\text{all of } a[i+1]=b[1], \ldots, a[i+m]=b[m] \tag{28}$$

hold true.

Figure 2:
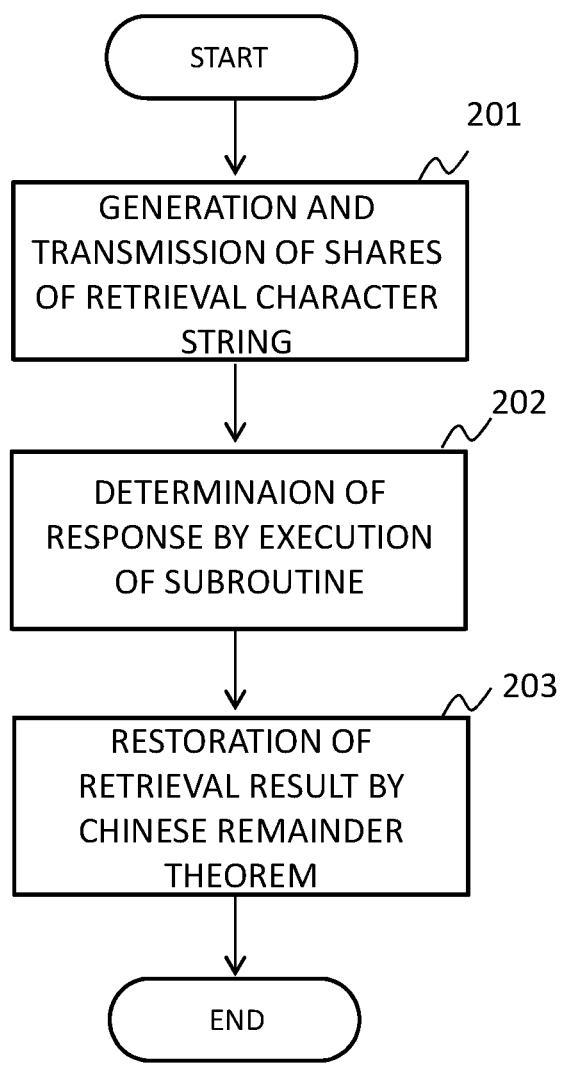
FIG. 2 is a diagram illustrating an operation procedure of an example embodiment of the present invention.

FIG. 2 is a diagram for explaining the procedure of the embodiment. With reference to FIG. 2, the procedure that the retrieval apparatus 2 retrieves for b=b[1]∥ ... ∥b[m] as a partial character string from a character string group registered in the server apparatuses 3-1, ..., 3-N will be described.

Step 1:
The retrieval character string share generation unit 11 of the retrieval apparatus 2 generates shares of the retrieval character string b and sends the shares to the server apparatuses 3-1, ..., 3-N (201 in FIG. 2). Step 1 consists of the following steps.

Step 1.1:
For each p∈S, each k=1, ..., m, the retrieval character string share generation unit 21 of the retrieval apparatus 2 executes $$\text{Share}(b[k],N,p) \tag{29}$$

and obtains the output (share of retrieval character string):

$$y[k,1], \ldots, y[k,N] \tag{30}.$$

Step 1.2:
For each α=1, ..., N, each k=1, ..., m, the retrieval apparatus 2 sends the share y[k, α] of the retrieval character string to the server apparatus 3-α.

Step 2:
The server apparatuses 3-1, ..., 3-N each determine a response by execution of a subroutine (202 in FIG. 2). Step 2 consists of the following four steps 2.1 to 2.4 (omitted in FIG. 2).

Step 2.1:
For each t=1, 2, ..., each p∈S, the following is executed:

Step 2.1.1:
For each α=1, ..., N, the server apparatus 3-α reads the share of the registration character string x[t, j, α, p].

Step 2.1.2:
The server apparatus 3-1 obtains x[t,1,1,p]∥ ... ∥x[t,n,1,p] as an input, the server apparatus 3-2 obtains x[t,1,2,p]∥ ... ∥x[t,n,2,p] as an input, ..., and the server apparatus 3-N obtains x[t,1,N,p]∥ ... ∥x[t,n,N,p] as an input, and each calls a subroutine which is described later, using the share of the retrieval character string y[k, α](k=1, ..., m, α=1, ..., N).

Each of the server apparatuses 3-1, ..., 3-N obtains $$e[t,1,p], \ldots, e[t,N,p] \tag{31}$$

as an output of the subroutine.

Step 2.2:
For each t=1, 2, ..., each p∈S, the server apparatuses 3-1, ..., 3-N disclose e[t, 1, p], ..., e[t, N, p], respectively.

However, for example, when the server apparatus 3-α is an unauthorized server apparatus, the server apparatus 3-α may not necessarily disclose e[t, α, p]. Therefore, there may be a case wherein the number of items of the disclosed data is less than the number N of the server apparatuses.

Step 2.3:
For each t=1, 2, ..., for each p∈S, let $$E[t]=\{\alpha | \text{the server apparatus 3-}\alpha \text{ disclosed } e[t,\alpha,p]\} \tag{32},$$

and
in the case of $$E[t]\in \text{Access} \tag{33}$$

(when E [t] is included in a set Access),
the server apparatuses 3-1, ..., 3-N each execute $$\text{Reconst}(e[t,1,p], \ldots, e[t,N,p]) \tag{34},$$

and obtain f[t, p] as its output.

On the other hand, if it is not the case of E[t]∈Access, the retrieval procedure fails, and the retrieval procedure ends here.

Step 2.4:
For each t=1, 2, ..., for each α=1, ..., N, the following step 2.4.1 is executed.

Step 2.4.1:
If there is p∈S such that $$f[t,p]\neq 0 \bmod p \tag{35}$$

the server apparatus 3-α sends $$x[t,1,\alpha,p] \| \ldots \| x[t,n,\alpha,p] \tag{36}$$

to the retrieval apparatus 2.

However, since an unauthorized server apparatus does not always send x[t,1, α,p]∥ ... ∥x[t,n, α,p] to the retrieval apparatus 2, the number of items of data that the retrieval apparatus 2 receives may be less than the number N of the server apparatuses.

Step 3:
The retrieval apparatus 2 reconstructs the retrieval result by the Chinese remainder theorem as follows (203 in FIG. 2).

Step 3.1:
For each t=1, 2, ..., each p∈S, let $$X[t]=\{\alpha | \text{the server apparatus 3-}\alpha \text{ has sent } x[t,1,\alpha,p] \| \ldots \| x[t,n,\alpha,p] \text{ to the retrieval apparatus 2}\} \tag{37}.$$

Step 3.2:
In the case of $$X[t]\in \text{Access} \tag{38}$$

the following steps are performed.

Step 3.2.1:
For each p∈S, the retrieval apparatus 2 executes for each j=1, ..., n:

$$\text{Reconst}((x[t,j,\alpha,p])_{\alpha\in X[t]}) \tag{39}$$

and obtains g[t,j,p] as an output

Step 3.2.2:

$$ChineseRemainder((g[t,j,p])_{p \in S}) \quad (40)$$

is executed and a[t, j] is obtained as its output.
Step 3.2.3:
Let $$a[t]=a[t,1]\| \ldots \|a[t,n] \quad (41),$$

and the t-th data a[t] is outputted regarded as retrieved.

In Step 3, a subroutine is executed for each t=1, 2, ..., for each p∈S, so that the subroutine is executed for (number of t)×(number of p) times. These subroutines may be done in parallel or concurrently, or may be performed sequentially one by one.
<Subroutine>

Figure 3:
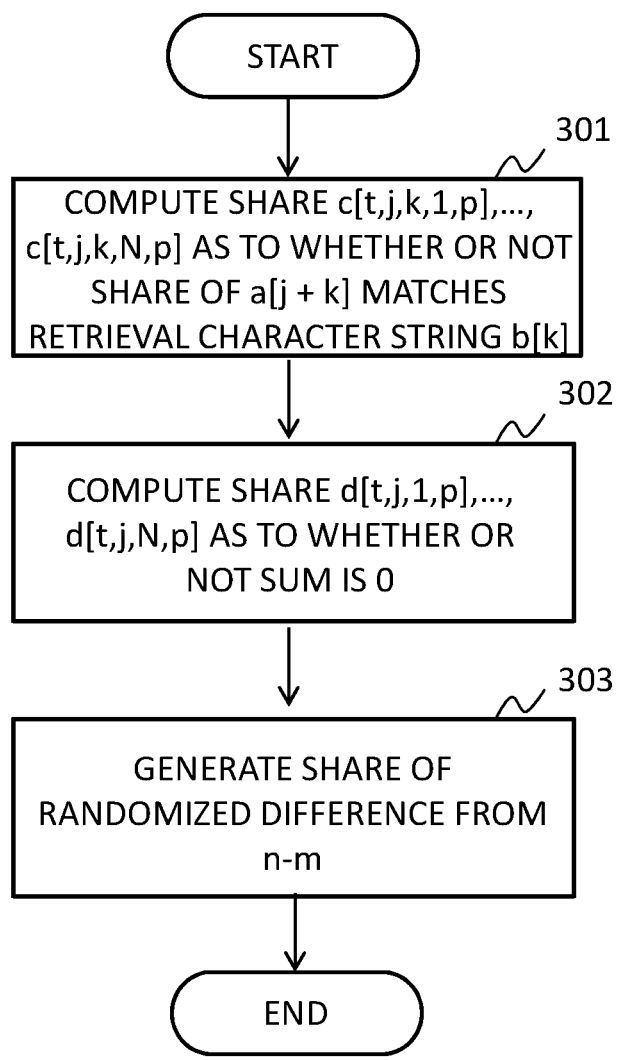
FIG. 3 is a diagram illustrating an operation procedure of an example embodiment of the present invention.

FIG. 3 is a diagram explaining procedures of the subroutine. With reference to FIG. 3, processing (operation processing) of a subroutine will be described.

In the server apparatus 3-1, the subroutine inputs x[t,1,1,p]|| ... ||x[t,n,1,p], y[k,1,p](k=1, ..., m) ..., and in the server apparatus 3-N, the subroutine inputs x[t,1,N,p]|| ... ||x[t,n,N,p], y[k,N,p](k=1, ..., m) and performs the following steps 1 to 3. Note that y[k, α, p] is the share in the retrieval character string generated for each p∈S, each k=1, ..., m.
Step 1:
Compute the share c[t,j,k,1,p], ..., c[t,j,k,N,p] on whether or not the share of a[t, j+k] matches the retrieval character string b[k] (301 in FIG. 3).

Step 1 (301 in FIG. 3) of the subroutine consists of steps 1.1 and 1.2 (not shown in FIG. 3).
Step 1.1:
For each α=1, ..., N, each j=1, ..., n−m, each k=1, ..., m, the server apparatus 3-α computes $$z[t,j,k,\alpha,p]=x[t,j+k,\alpha,p]-y[j,\alpha,p] \bmod p \quad (42)$$

Step 1.2:
For each j=1, ..., n−m, each k=1, ..., m, the server apparatuses 3-1, ..., 3-N respectively receive $$(z[t,j,k,1,p],\lambda(p)), \ldots ,(z[t,j,k,N,p],\lambda(p)) \quad (43)$$

as an input and execute the modular exponentiation MPC protocol. Note that λ(p) is a Carmichael function (a^λ(p)=1 mod p for a disjoint a with p).

The server apparatuses 3-1, ..., 3-N respectively obtain $$c[t,j,k,1,p], \ldots ,c[t,j,k,N,p] \quad (44)$$

as the execution result of the modular exponentiation MPC protocol.
Step 2:
The server apparatuses 3-1, ..., 3-N compute shares d[t,j,1,p], ..., d[t,j,N,p] as to whether or not the sum of k=1 to m of c[t,j,k,1,p], ... c[t,j,k,N,p] is 0. Step 2 includes steps 2.1 and 2.2 (not shown in FIG. 3).
Step 2.1:
For each α=1, ..., N, each j=1, ..., n−m, the server apparatus 3-α computes $$u[t,j,\alpha,p]=\Sigma_{k=1}^{m} c[t,i,k,\alpha,p] \quad (45)$$

Step 2.2:
For each j=1, ..., n−m,
the server apparatuses 3-1, ..., 3-N respectively obtain $$(u[t,j,1,p],\Delta(p),p), \ldots ,(u[t,j,N,p],\lambda(p),p) \quad (46)$$

as an input and execute the modular exponentiation MPC protocol.
The server apparatuses 3-1, ..., 3-N respectively obtain $$d[t,j,1,p], \ldots ,d[t,j,N,p] \quad (47)$$

as the execution result of the modular exponentiation MPC protocol.
Step 3:
Generate shares of the randomized difference from n−m (303 in FIG. 3).
Step 3 consists of the following steps 3.1, 3.2, 3.3.
Step 3.1:
For each α=1, ..., N,
the server apparatus 3-α computes $$v[t,\alpha,p]=n-m-\Sigma_{j=1}^{n-m} d[t,j,\alpha,p] \quad (48)$$

Step 3.2:
The server apparatuses 3-1, ..., 3-N respectively perform pseudo random number generation MPC protocol using p as an input and obtain $$r[t,1,p], \ldots ,r[t,N,p] \quad (49)$$

as outputs.
Step 3.3:
The server apparatuses 3-1, ..., 3-N respectively receive $$(v(v[t,1,p],r[t,1,p]), \ldots ,(v[t,N,p],r[t,N,p]) \quad (50)$$

as inputs and execute the multiplicative modulus MPC protocol, and respectively obtain $$e[t,1,p], \ldots ,e[t,N,p] \quad (51).$$

In Step 1.2, the modular exponentiation MPC protocol is executed for each j=1, ..., n−m, k=1, ..., m, so that modular exponentiation MPC is performed for (n−m)m times. However, these modular exponentiation MPCs may be performed in parallel or sequentially one by one.

Likewise, in Step 2.2, the modular exponentiation MPC is performed a total of n−m times, but these modular exponentiation MPCs may be performed in parallel or sequentially one by one.

Furthermore, since the random number generation MPC of Step 3.2 can be executed independently from Steps 1.1, 1.2, 2.1, 2.2, and 3.1, Step 3.2 may be executed concurrently when executing Steps 1.1, 1.2, 2.1, 2.2, and 3.1, or at first Step 3.2 may be executed and then Steps 1.1, 1.2, 2.1, 2.2, and 3.1 may be executed.

In addition, in Steps 1.2 and 2.2, the modular exponentiation MPC is performed using the Carmichael function value, λ(p), but usage of a multiple of λ(p), instead of Δ(p), works correctly. Usage of the Euler function value φ(p), instead of λ(p), also works correctly.

The disclosures of the above non-patent documents are incorporated herein by reference. Within the framework of the entire disclosure (including the scope of claims) of the present invention, it is possible to change/adjust the embodiment or example based on the basic technical thought further. Also, various combinations or selections of various disclosed elements (including each element of each claim, each element of each embodiment, each element of each drawing, etc.) are possible within the scope of the claims of the present invention. That is, it goes without saying that the present invention includes various modifications and modifications that could be made by those skilled in the art according to the entire disclosure including the claims, and technical ideas.

The above-described embodiment is attached as follows (however, it is not limited to the following).
(Supplementary Note 1)

A secret character string calculation system comprising: a registration apparatus; a retrieval apparatus; and a plurality of server apparatuses, wherein the registration apparatus comprises a registration character string share generation unit configured to generate shares by secret sharing of a registration character string, with a plurality of modulus, wherein the registration apparatus sends the shares generated by the registration character string share generation unit to the plurality of server apparatuses, respectively, wherein the plurality of server apparatuses respectively store the received shares in storage units thereof, wherein the retrieval apparatus further comprises a retrieval character string share generation unit configured to generate shares by secret sharing of a retrieval character string with the plurality of modulus, wherein the retrieval apparatus sends the shares generated by the retrieval character string share generation unit to the plurality of server apparatuses, respectively, wherein the plurality of server apparatuses each comprise a retrieval response calculation unit configured to execute a predetermined operation processing for the shares of each character string stored in the each storage unit and for each of the plurality of modulus, reconstruct the execution result of the operation processing, and determine, based on the reconstruction result of the execution result, whether or not to return the shares of the registration character string stored in the storage unit, as a retrieval result, and wherein the retrieval apparatus further comprises a reconstruction unit configured to reconstruct shares returned from the plurality of server apparatuses, and reconstruct, using the Chinese remainder theorem, a retrieval result from the reconstructed result.

(Supplementary Note 2)

The secret character string calculation system according to Supplementary note 1, wherein the registration character string is a=a[1]|| . . . ||a[n], and the retrieval character string is b=b[1]|| . . . ||b[m] (where || is a concatenation operator, m and n are respective number of words of b and a such that m<n), wherein the retrieval response calculation unit of the server apparatus, as the predetermined operation processing, executes a first multiparty computation protocol to calculate shares of a value which is 1 or 0 depending on whether or not the share of the (j+k)th word of the registration character string matches the kth word of the retrieval character string, for each j (j=1, . . . , n−m) and for each k (k=1, . . . , m), sums, for k=1 to m, the shares calculated by the first multiparty computation protocol with the modulus, for each j (j=1, . . . , n−m)

executes a second multiparty computation protocol to calculate shares of a value which is 0 or 1 depending on whether or not the summed share is 0, for each j (j=1, . . . , n−m), subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

(Supplementary Note 3)

The secret character string calculation system according to Supplementary note 2, wherein, in the retrieval response calculation unit, the first multiparty computation protocol executes a multiparty computation protocol that the kth word of the retrieval character string subtracted from the share of the (j+k)th word of the registration character string with the modulus is modular exponentiated by the Carmichael function value of the modulus, and the second multiparty computation protocol executes a multiparty computation protocol to modular-exponentiate the sum of shares by a Carmichael function value of the modulus.

(Supplementary Note 4)

A method for performing a secret character string calculation by a computer system including a plurality of server apparatuses, the method comprising:

generating shares by secret sharing of a registration character string with a plurality of modulus and sending the shares to the plurality of server apparatuses, respectively, to have the shares stored in the plurality of server apparatuses;

sending shares generated by secret sharing of a retrieval character string with the plurality of modulus to the plurality of server apparatuses;

the plurality of server apparatuses each calling a subroutine for the stored shares of each registration character string and for each of the plurality of modulus, to execute an operation processing, reconstruct the execution result of the operation processing, and determine, based on the reconstruction result of the execution result, whether or not to return the stored shares of the registration character string as a retrieval result; and reconstructing the shares returned from the plurality of server apparatuses, and reconstructing, using the Chinese remainder theorem, the retrieval result from the reconstructed result.

(Supplementary Note 5)

The method for performing a secret character string calculation according to Supplementary note 4, wherein the registration character string is a=a[1]|| . . . ||a[n], the retrieval character string is b=b[1]|| . . . ||b[m] (II is a concatenation operator, m and n are respective number of words of b and a such that m<n), wherein the subroutine called by the server apparatus for each j (j=1, . . . , n−m) and for each k (k=1, . . . , m), executes a first multiparty computation protocol to calculate shares of a value which is 1 or 0 depending on whether or not the share of the (j+k)th word of the registration character string matches the kth word of the retrieval character string for each j and each k, sums for k=1 to m, the shares calculated by the first multiparty computation protocol for each j, executes a second multiparty computation protocol to calculate shares of a value to be 0 or 1 depending on whether or not the summed share is 0, for each j (j=1, . . . , n−m), subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

(Supplementary Note 6)

The method for performing a secret character string calculation according to Supplementary note 5, wherein in the subroutine, the first multiparty computation protocol executes a multiparty computation protocol that the kth word of the retrieval character string subtracted from the share of the (j+k)th word of the registration character string with the modulus is modular exponentiated by the Carmichael function value of the modulus, and the second multiparty computation protocol executes a multiparty computation protocol to modular-exponentiate the sum of shares by a Carmichael function value of the modulus.

(Supplementary Note 7)

A server apparatus comprising:

a communication unit configured to receive shares sent from a registration apparatus that generates the shares by secret sharing of a registration character string with a plurality of modulus, to a plurality of server apparatuses;

a storage unit configured to store the received share of the registration character string; and a retrieval response calculation unit configured to execute a predetermined operation processing for the shares of each character string stored in the storage unit and for each of the plurality of modulus, reconstruct the execution result and determine, based on the reconstruction result of the execution result, whether or not to return the shares of the registration character string stored in the storage unit as a retrieval result, when the communication unit receives shares from a retrieval apparatus that sends the shares by secret sharing of a retrieval character string with the plurality of modulus to the plurality of server apparatuses, wherein the server apparatus sends the shares of the retrieval result, via the communication unit, to the retrieval apparatus that is operable to reconstruct, using the Chinese remainder theorem, a retrieval result from a reconstructed result of the shares returned from each of the server apparatuses.

(Supplementary Note 8)

The server apparatus according to Supplementary note 7, wherein the registration character string is a=a[1]|| ... ||a[n], the retrieval character string is b=b[1]|| ... ||b[m] (where || is a concatenation operator, m and n are respective number of words of b and a such that m<n), wherein the retrieval response calculation unit, as the predetermined operation processing, executes a first multiparty computation protocol to calculate shares of a value which is 1 or 0 depending on whether or not the share of the (j+k)th word of the registration character string matches the kth word of the retrieval character string, for each j (j=1, ..., n−m) and for each k (k=1, ..., m), sums for k=1 to m, the shares calculated by the first multiparty computation protocol with the modulus, for each the j, executes a second multiparty computation protocol to calculate shares of a value which is 0 or 1 depending on whether or not the summed share is 0, subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

(Supplementary Note 9)

The server apparatus according to Supplementary note 8, wherein, in the retrieval response calculation unit, the first multiparty computation protocol executes a multiparty computation protocol that the kth word of the retrieval character string subtracted from the share of the (j+k)th word of the registration character string with the modulus is modular exponentiated by the Carmichael function value of the modulus, and the second multiparty computation protocol executes a multiparty computation protocol to modular-exponentiate the sum of shares by a Carmichael function value of the modulus.

(Supplementary Note 10)

A non-transitory computer-readable recording medium storing therein a program causing a computer constituting a server apparatus to execute processing comprising:

receiving shares and storing the shares in a storage unit, the shares being sent from a registration apparatus that generates the shares by secret sharing of a registration character string with a plurality of modulus and sends the shares to a plurality of server apparatuses;

performing a retrieval response calculation including executing a predetermined operation processing for the share of the each registration character string stored in the storage unit and for each of the plurality of modulus, reconstructing the execution result of the operation processing and determining, based on the reconstruction result of the execution result, whether or not to return the shares of the registration character string stored in the storage unit as a retrieval result; and sending the shares of the retrieval result to the retrieval apparatus.

(Supplementary Note 11)

The non-transitory computer-readable recording medium according to Supplementary note 10, wherein the registration character string is a=a[1]|| ... ||a[n], the retrieval character string is b=b[1]|| ... ||b[m] (where || is a concatenation operator, m and n are respective number of words of b and a such that m<n), wherein the retrieval response calculation processing, as the predetermined operation processing, executes a first multiparty computation protocol to calculate shares of a value which is 1 or 0 depending on whether or not the share of the (j+k)th word of the registration character string matches the kth word of the retrieval character string, for each j (j=1, ..., n−m) and for each k (k=1, ..., m), sums for k=1 to m, the shares calculated by the first multiparty computation protocol with the modulus, for each the j, executes a second multiparty computation protocol to calculate shares of a value which is 0 or 1 depending on whether or not the summed share is 0, subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

(Supplementary Note 12)

The non-transitory computer-readable recording medium according to Supplementary note 10, wherein, in the retrieval response calculation processing, the first multiparty computation protocol executes a multiparty computation protocol that the kth word of the retrieval character string subtracted from the share of the (j+k)th word of the registration character string with the modulus is modular exponentiated by the Carmichael function value of the modulus, and the second multiparty computation protocol executes a multiparty computation protocol to modular-exponentiate the sum of shares by a Carmichael function value of the modulus.

(Supplementary Note 13)

A retrieval apparatus comprising:

a communication unit that connects to a plurality of server apparatuses that receive and store shares sent from a registration apparatus that generates the shares by secret sharing of a registration character string with a plurality of modulus, and a retrieval character string share generation unit that generates shares by secret sharing of a retrieval character string with the plurality of modulus, wherein the retrieval apparatus sends the shares generated by the retrieval character string share generation unit to the plurality of server apparatuses respectively via the communication unit, wherein the plurality of server apparatuses execute a predetermined operation processing for the shares of each character string stored in the storage unit and for each of the plurality of modulus, reconstruct the execution result of the operation processing and determine, based on the reconstruction result of the execution result, whether or not to return the shares of the registration character string stored in the storage unit as a retrieval result, the retrieval apparatus further comprising:

a restoration apparatus configured to reconstruct shares returned from the plurality of server apparatuses and received via the communication unit, and reconstructs, using the Chinese remainder theorem, the retrieval result from the reconstructed result.

(Supplementary Note 14)

A non-transitory computer-readable recording medium storing therein a program causing a computer constituting a retrieval apparatus connecting to a plurality of server apparatuses that receive and store shares sent from a registration apparatus that generates the shares by secret sharing of a registration character string with a plurality of modulus, to execute:

a first processing that generates shares by secret sharing of a retrieval character string with the plurality of modulus to sends the shares generated to the plurality of server apparatuses, wherein the plurality of server apparatuses execute a predetermined operation processing for the shares of each character string stored in the storage unit and for each of the plurality of modulus, reconstruct the execution result of the operation processing and determine, based on the reconstruction result of the execution result, whether or not to return the shares of the registration character string stored in the storage unit as a retrieval result; and a second processing that reconstruct the shares returned from the plurality of server apparatuses and reconstructs, using Chinese remainder theorem. the retrieval result from the reconstructed result.

The invention claimed is:

1. A secret character string calculation system comprising:
a registration apparatus;
a retrieval apparatus; and
a plurality of server apparatuses,
wherein the registration apparatus comprises:
a first processor; and
a first memory coupled to the first processor and storing program instructions executable by the first processor, wherein the first processor is configured to generate shares by secret sharing of a registration character string, with a plurality of modulus, and send the shares generated to the plurality of server apparatuses, respectively, wherein the retrieval apparatus comprises:
a second processor; and
a second memory coupled to the second processor and storing program instructions executable by the second processor, wherein the second processor is configured to generate shares by secret sharing of a retrieval character string with the plurality of modulus, and send the shares generated to the plurality of server apparatuses, respectively,
wherein each of the plurality of server apparatuses comprises:
a third processor;
a third memory coupled to the third processor and storing program instructions executable by the third processor; and
a storage unit that stores the shares sent from the registration apparatus, wherein the third processor is configured to execute a predetermined operation processing for the shares of each character string stored in the storage unit and for each of the plurality of modulus, reconstruct an execution result of the operation processing, and determine, based on a reconstruction result of the execution result, whether or not to return the shares of the registration character string stored in the storage unit, as a retrieval result, when the each of the plurality of server apparatuses receives the shares from the retrieval apparatus, and
wherein the second processor included in the retrieval apparatus is further
configured to reconstruct shares returned from the plurality of server apparatuses, and reconstruct, using the Chinese remainder theorem, a retrieval result from the reconstructed result of the shares.

2. The secret character string calculation system according to claim 1, wherein the registration character string is $a=a[1]\|\ldots\|a[n]$, and the retrieval character string is $b=b[1]\|\ldots\|b[m]$ (where $\|$ is a concatenation operator, m and n are respective number of words of b and a such that m<n), wherein the third processor included in the server apparatus, as the predetermined operation processing, executes a first multiparty computation protocol to calculate shares of a value which is 1 or 0 depending on whether or not the share of the (j+k)th word of the registration character string matches the kth word of the retrieval character string, for each j (j=1, ..., n−m) and for each k (k=1, ..., m), sums, for k=1 to m, the shares calculated by the first multiparty computation protocol with the modulus, for each j (j=1, ..., n−m), executes a second multiparty computation protocol to calculate shares of a value which is 0 or 1 depending on whether or not the summed share is 0, for each j (j=1, ..., n−m), subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

3. The secret character string calculation system according to claim 2, wherein the third processor included in the server apparatus, as the first multiparty computation protocol, executes a multiparty computation protocol that the kth word of the retrieval character string subtracted from the share of the (j+k)th word of the registration character string with the modulus is modular exponentiated by the Carmichael function value of the modulus, and the third processor, as the second multiparty computation protocol, executes a multiparty computation protocol to modular-exponentiate the sum of shares by a Carmichael function value of the modulus.

4. A method for performing a secret character string calculation by a computer system including a plurality of server apparatuses, the method comprising:

generating shares by secret sharing of a registration character string with a plurality of modulus and sending the shares to the plurality of server apparatuses, respectively, to have the shares stored in the plurality of server apparatuses;

sending shares generated by secret sharing of a retrieval character string with the plurality of modulus to the plurality of server apparatuses;

the plurality of server apparatuses each calling a subroutine for the stored shares of each registration character string and for each of the plurality of modulus, to execute an operation processing, reconstruct an execution result of the operation processing, and determine, based on a reconstruction result of the execution result, whether or not to return the stored shares of the registration character string as a retrieval result; and reconstructing the shares returned from the plurality of server apparatuses, and reconstructing, using the Chinese remainder theorem, a retrieval result from the reconstructed result of the shares.

5. The method according to claim 4, wherein the registration character string is a=a[1]‖ . . . ‖a[n], the retrieval character string is b=b[1]‖ . . . ‖b[m] (‖ is a concatenation operator, m and n are respective number of words of b and a such that m<n), wherein the subroutine called by the server apparatus for each j (j=1, . . . , n−m) and for each k (k=1, . . . , m), executes a first multiparty computation protocol to calculate shares of a value which is 1 or 0 depending on whether or not the share of the (j+k)th word of the registration character string matches the kth word of the retrieval character string for each j and each k, sums for k=1 to m, the shares calculated by the first multiparty computation protocol for each j, executes a second multiparty computation protocol to calculate shares of a value to be 0 or 1 depending on whether or not the summed share is 0, for each j (j=1, . . . , n−m), subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

6. The method according to claim 5, wherein in the subroutine, the first multiparty computation protocol executes a multiparty computation protocol that the kth word of the retrieval character string subtracted from the share of the (j+k)th word of the registration character string with the modulus is modular exponentiated by the Carmichael function value of the modulus, and the second multiparty computation protocol executes a multiparty computation protocol to modular-exponentiate the sum of shares by a Carmichael function value of the modulus.

7. A server apparatus comprising:

a processor;

a memory coupled to the processor and storing program instructions executable by the processor;

a transceiver configured to receive shares sent from a registration apparatus that generates the shares by secret sharing of a registration character string with a plurality of modulus, to a plurality of server apparatuses; and a storage unit configured to store the received shares of the registration character string, wherein the processor is configured to execute a predetermined operation processing for the shares of each character string stored in the storage unit and for each of the plurality of modulus, reconstruct an execution result, and determine, based on a reconstruction result of the execution result, whether or not to return the shares of the registration character string stored in the storage unit as a retrieval result, when the transceiver receives shares from a retrieval apparatus that sends the shares by secret sharing of a retrieval character string with the plurality of modulus to the plurality of server apparatuses, and wherein the transceiver sends the shares of the retrieval result to the retrieval apparatus that is operable to reconstruct, using the Chinese remainder theorem, a retrieval result from a reconstructed result of the shares returned from each of the server apparatuses.

8. The server apparatus according to claim 7, wherein the registration character string is a=a[1]‖ . . . ‖a[n], the retrieval character string is b=b[1]‖ . . . ‖b[m] (where ‖ is a concatenation operator, m and n are respective number of words of b and a such that m<n), wherein the processor, as the predetermined operation processing, executes a first multiparty computation protocol to calculate shares of a value which is 1 or 0 depending on whether or not the share of the (j+k)th word of the registration character string matches the kth word of the retrieval character string, for each j (j=1, . . . , n−m) and for each k (k=1, . . . , m), sums for k=1 to m, the shares calculated by the first multiparty computation protocol with the modulus, for each the j, executes a second multiparty computation protocol to calculate shares of a value which is 0 or 1 depending on whether or not the summed share is 0, subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

9. The server apparatus according to claim 8, wherein the processor, as the first multiparty computation protocol, executes a multiparty computation protocol that the kth word of the retrieval character string subtracted from the share of the (j+k)th word of the registration character string with the modulus is modular exponentiated by the Carmichael function value of the modulus, and the processor, as the second multiparty computation protocol, executes a multiparty computation protocol to modular-exponentiate the sum of shares by a Carmichael function value of the modulus.

10. A non-transitory computer-readable recording medium having stored thereon a program that, upon execution by a computer constituting a server apparatus, causes the server apparatus to execute processing comprising:

receiving shares, and storing the shares in a storage unit, the shares being sent from a registration apparatus that generates the shares by secret sharing of a registration character string with a plurality of modulus and sends the shares to a plurality of server apparatuses; and performing a retrieval response calculation including executing a predetermined operation processing for the shares of the registration character string stored in the storage unit and for each of the plurality of modulus, reconstructing an execution result of the operation processing, and determining, based on a reconstruction result of the execution result, whether or not to return the shares of the registration character string stored in the storage unit as a retrieval result, wherein the shares of the retrieval result, determined by said determining to be returned, are sent to a retrieval apparatus that is operable to reconstruct, using the Chinese remainder theorem, a retrieval result from a reconstructed result of the shares returned from each of the server apparatuses.

11. A retrieval apparatus comprising:

a processor;

a memory coupled to the processor and storing program instructions executable by the processor; and a transceiver configured to communicatively connect to a plurality of server apparatuses that receive from a registration apparatus that generates shares by secret sharing of a registration character string with a plurality of modulus, wherein the processor is configured to generate shares by secret sharing of a retrieval character string with the plurality of modulus, and the transceiver sends the shares generated to the plurality of server apparatuses, respectively, wherein the plurality of server apparatuses each executes a predetermined operation processing for the shares of each character string stored in the each storage unit and for each of the plurality of modulus, reconstructs an execution result of the operation processing, and determines, based on a reconstruction result of the execution result, whether or not to return the shares of the registration character string stored in the storage unit, as a retrieval result, wherein the processor is further configured to reconstruct shares returned from the plurality of server apparatuses, and reconstruct, using the Chinese remainder theorem, a retrieval result from the reconstructed result of the shares.

12. The non-transitory computer-readable recording medium according to claim 10, wherein the registration character string is $a=a[1]\|\ldots\|a[n]$, the retrieval character string is $b=b[1]\|\ldots\|b[m]$ (where $\|$ is a concatenation operator, m and n are respective number of words of b and a such that m<n), wherein the retrieval response calculation processing, as the predetermined operation processing, executes a first multiparty computation protocol to calculate shares of a value which is 1 or 0 depending on whether or not the share of the (j+k)th word of the registration character string matches the kth word of the retrieval character string, for each j (j=1, . . . , n−m) and for each k (k=1, . . . , m), sums for k=1 to m, the shares calculated by the first multiparty computation protocol with the modulus, for each the j, executes a second multiparty computation protocol to calculate shares of a value which is 0 or 1 depending on whether or not the summed share is 0, subtracts the number of words of the retrieval character string and a sum of the shares calculated by the second multiparty computation protocol from the number of words of the registration character string with the modulus, and outputs a result obtained by multiplying the subtracted value by a share obtained by a random number generating multiparty computation protocol with the modulus.

13. The non-transitory computer-readable recording medium according to claim 12, wherein in the retrieval response calculation processing, the first multiparty computation protocol executes a multiparty computation protocol that the kth word of the retrieval character string subtracted from the share of the (j+k)th word of the registration character string with the modulus is modular exponentiated by the Carmichael function value of the modulus, and the second multiparty computation protocol executes a multiparty computation protocol to modular-exponentiate the sum of shares by a Carmichael function value of the modulus.

* * * * *